United States Patent
Ramasubramonian et al.

(10) Patent No.: US 10,397,443 B2
(45) Date of Patent: Aug. 27, 2019

(54) METHODS AND SYSTEMS FOR GENERATING COLOR REMAPPING INFORMATION SUPPLEMENTAL ENHANCEMENT INFORMATION MESSAGES FOR VIDEO

(71) Applicant: QUALCOMM Incorporated, San Diego, CA (US)

(72) Inventors: Adarsh Krishnan Ramasubramonian, San Diego, CA (US); Joel Sole Rojals, San Diego, CA (US); Dmytro Rusanovskyy, San Diego, CA (US); Done Bugdayci Sansli, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 15/436,313

(22) Filed: Feb. 17, 2017

(65) Prior Publication Data

US 2017/0257529 A1    Sep. 7, 2017

Related U.S. Application Data

(60) Provisional application No. 62/302,143, filed on Mar. 1, 2016.

(51) Int. Cl.
| | |
|---|---|
| *H04N 1/60* | (2006.01) |
| *G06T 7/90* | (2017.01) |
| *H04N 19/70* | (2014.01) |
| *H04N 19/186* | (2014.01) |

(52) U.S. Cl.
CPC ............... *H04N 1/60* (2013.01); *G06T 7/90* (2017.01); *H04N 19/186* (2014.11);
(Continued)

(58) Field of Classification Search
CPC ...... H04N 1/60; H04N 1/6025; H04N 19/186; H04N 19/70; G06T 7/90; G06T 2207/10016; G06T 2207/10024
(Continued)

(56) References Cited

U.S. PATENT DOCUMENTS

| | | | |
|---|---|---|---|
| 2018/0035015 A1* | 2/2018 | Olivier | H04N 1/6025 |
| 2018/0242006 A1* | 8/2018 | Kerofsky | H04N 19/70 |

(Continued)

FOREIGN PATENT DOCUMENTS

WO    2015007599 A1    1/2015

OTHER PUBLICATIONS

Andrivon P., et al., "AVC Update with Colour Remapping Information SEI message", MPEG Meeting, ISO/IEC JTC1/SC29/WG11 No. m35665, Feb. 3, 2015, XP030064033, 8 pages.
(Continued)

*Primary Examiner* — Ali Bayat
(74) *Attorney, Agent, or Firm* — Polsinelli LLP

(57) ABSTRACT

Systems, methods, and computer readable media are described for providing improved color remapping. In some examples, a video bitstream is obtained that includes a plurality of pictures having a first color characteristic. A color remapping information (CRI) supplemental enhancement information (SEI) message is identified from the video bitstream. A restriction is placed on the CRI SEI message such that a value of a syntax element of the CRI SEI message is restricted based on a condition. One or more samples of the plurality of pictures is remapped from the first color characteristic to a second color characteristic using a color remapping model of the CRI SEI message according to the restriction. In some cases, the condition is a chroma format of the plurality of pictures, in which case the value of the syntax element of the CRI SEI message is restricted based
(Continued)

on the chroma format. In some cases, the condition is a color remap value identifying a purpose of the color remapping model of the CRI SEI message, in which case the value of the syntax element of the CRI SEI message is restricted based on the color remap value.

28 Claims, 8 Drawing Sheets

(52) U.S. Cl.
CPC .... *H04N 19/70* (2014.11); *G06T 2207/10016* (2013.01); *G06T 2207/10024* (2013.01)

(58) Field of Classification Search
USPC .......................................................... 382/167
See application file for complete search history.

(56) References Cited

U.S. PATENT DOCUMENTS

| | | | |
|---|---|---|---|
| 2018/0278967 A1* | 9/2018 | Kerofsky | G06T 5/009 |
| 2018/0288381 A1* | 10/2018 | He | H04N 1/6005 |
| 2018/0332286 A1* | 11/2018 | Pettersson | H04N 19/14 |

OTHER PUBLICATIONS

Andrivon P., et al., "Colour Remapping Information SEI Message for AVC," 112, MPEG Meeting; Jun. 22, 2015-Jun. 26, 2015; Warsaw; (Motion Picture Expert Group or ISO/IEC JTC1/SC29/WG11),, No. m36521, Jun. 19, 2015 (Jun. 19, 2015), XP030064889, 11 pages.

International Search Report and Written Opinion—PCT/US2017/018624—ISA/EPO—May 9, 2017.

Qualcomm: "Using the CRI SEI Message for Range Adjustment for HDR/WCG Video Compression", ITU-T SG16 Meeting, Sep. 29, 2015, XP030100742, 5 pages.

Ramasubramonian A.K., et al., "Clarifications on the Semantics of CRI SEI Message and its Usage for HDR/WCG Video Compression," 22, JCT-VC Meeting; Oct. 15, 2015 Oct. 21, 2015; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-V0064, Oct. 6, 2015 (Oct. 6, 2015), XP030117718, 3 pages.

* cited by examiner

400

| colour_remapping_info( payloadSize ) { | Descriptor |
|---|---|
|   colour_remap_id | ue(v) |
|   colour_remap_cancel_flag | u(1) |
|   if( !colour_remap_cancel_flag ) { | |
|     colour_remap_persistence_flag | u(1) |
|     colour_remap_video_signal_info_present_flag | u(1) |
|     if( colour_remap_video_signal_info_present_flag ) { | |
|       colour_remap_full_range_flag | u(1) |
|       colour_remap_primaries | u(8) |
|       colour_remap_transfer_function | u(8) |
|       colour_remap_matrix_coefficients | u(8) |
|     } | |
|     colour_remap_input_bit_depth | u(8) |
|     colour_remap_output_bit_depth | u(8) |
|     for( c = 0; c < 3; c++ ) { | |
|       pre_lut_num_val_minus1[ c ] | u(8) |
|       if( pre_lut_num_val_minus1[ c ] > 0 ) | |
|         for( i = 0; i <= pre_lut_num_val_minus1[ c ]; i++ ) { | |
|           pre_lut_coded_value[ c ][ i ] | u(v) |
|           pre_lut_target_value[ c ][ i ] | u(v) |
|         } | |
|     } | |
|     colour_remap_matrix_present_flag | u(1) |
|     if( colour_remap_matrix_present_flag ) { | |
|       log2_matrix_denom | u(4) |
|       for( c = 0; c < 3; c++ ) | |
|         for( i = 0; i < 3; i++ ) | |
|           colour_remap_coeffs[ c ][ i ] | se(v) |
|     } | |
|     for( c = 0; c < 3; c++ ) { | |
|       post_lut_num_val_minus1[ c ] | u(8) |
|       if( post_lut_num_val_minus1[ c ] > 0 ) | |
|         for( i = 0; i <= post_lut_num_val_minus1[ c ]; i++ ) { | |
|           post_lut_coded_value[ c ][ i ] | u(v) |
|           post_lut_target_value[ c ][ i ] | u(v) |
|         } | |
|     } | |
|   } | |
| } | |

462 — pre_lut block

464 — matrix block

466 — post_lut block

OBTAIN A VIDEO BITSTREAM, THE VIDEO BITSTREAM INCLUDING A PLURALITY OF PICTURES HAVING A FIRST COLOR CHARACTERISTIC
502

IDENTIFY, FROM THE VIDEO BITSTREAM, A COLOR REMAPPING INFORMATION (CRI) SUPPLEMENTAL ENHANCEMENT INFORMATION (SEI) MESSAGE, WHEREIN ONE OR MORE VALUES OF AT LEAST ONE SYNTAX ELEMENT OF THE CRI SEI MESSAGE ARE RESTRICTED BASED ON A CONDITION
504

REMAP ONE OR MORE SAMPLES OF THE PLURALITY OF PICTURES FROM THE FIRST COLOR CHARACTERISTIC TO A SECOND COLOR CHARACTERISTIC USING A COLOR REMAPPING MODEL OF THE CRI SEI MESSAGE
506

FIG. 5

METHODS AND SYSTEMS FOR GENERATING COLOR REMAPPING INFORMATION SUPPLEMENTAL ENHANCEMENT INFORMATION MESSAGES FOR VIDEO

CROSS-REFERENCE TO RELATED APPLICATIONS

This application claims the benefit of U.S. Provisional Application No. 62/302,143, filed Mar. 1, 2016, which is hereby incorporated by reference, in its entirety for all purposes.

FIELD

This application is related to video coding and compression. More specifically, this application relates to improving the application of the color remapping information (CRI) Supplemental Enhancement Information (SEI) message.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

In some implementations, techniques and systems are described that improve the color remapping information (CRI) Supplemental Enhancement Information (SEI) message. SEI messages can be included in video bitstreams and can include information that a client-side device (e.g., a player, a decoder, or other client-side device) can use to improve the display or processing of the decoded output (e.g., to improve the viewability of the content).

The CRI SEI message includes information that is used to map or convert pictures having a first color characteristic to a second color characteristic. Color characteristics of pictures can include color spaces, dynamic ranges, transfer functions, or any other color characteristic that can vary across different video content. In one illustrative example, certain video content may have a first color characteristic (e.g., HDR video, high definition video, ultra-high definition video, a first transfer function, or other characteristic). However, some devices may have limitations that prevent them from processing video having the first color characteristic. For example, some player devices may only be able to process video having the second color characteristic (e.g., SDR video, standard definition video, a second transfer function, or other characteristic). In another example, some displays may only be able to display video having the second color characteristic. In such examples, pictures of the video content may need to be converted from the first color characteristic to the second color characteristic so that the pictures can be displayed by the player device.

The CRI SEI message is currently defined by the HEVC Standard as being applicable to only certain types of video content. For example, the semantics of the CRI SEI message in the HEVC Standard indicate that the color remapping model of the CRI SEI message can be applied to decoded video samples that are in the 4:4:4 chroma domain, and that decoded samples in the 4:2:0 domain or the 4:2:2 domain need to be upsampled to the 4:4:4 domain before the color remapping model can be applied. However, there are several reasons to apply the color remapping model of the CRI SEI message directly on samples that are in a domain other than 4:4:4.

Techniques and systems are described herein for generating a CRI SEI message that it is applicable to various types of video content. In some examples, the color remapping model of the CRI SEI message can be applied differently for video content of different types. For example, values of certain syntax elements of the CRI SEI message can be restricted or defined based on the type of video content and/or based on the purpose of the CRI SEI message. In some cases, a restriction is placed on the CRI SEI message such that one or more values of a syntax element of the CRI SEI message is restricted based on a condition. In one illustrative example, the condition can include a chroma format of pictures to which the color remapping model of a CRI SEI message will be applied. In such an example, the one or more values of the syntax element of the CRI SEI message is restricted based on the chroma format. In another illustrative example, the condition can include a color remap value (e.g., a value of a color_remap_id syntax element) identifying a purpose of the color remapping model of the CRI SEI message. In this example, the one or more values of the syntax element of the CRI SEI message are restricted based on the color remap value.

Restricting values of syntax elements of a CRI SEI message based on the type of video content and/or the purpose of the CRI SEI message allows certain parts of the color remapping model to be applied to the content while other parts of the color remapping model are not applied. For example, for video samples in the 4:2:0 domain, one or more lookup tables of the color remapping model may be applied to the samples, while a color remap matrix of the color remapping model may not be applied to the samples.

According to at least one example of processing video data, a method of processing video data is provided that comprises obtaining a video bitstream, the video bitstream including a plurality of pictures having a first color characteristic. The method further comprises identifying, from the video bitstream, a color remapping information (CRI) supplemental enhancement information (SEI) message, wherein one or more values of at least one syntax element of the CRI SEI message are restricted based on a condition. The method further comprises remapping one or more samples of the plurality of pictures from the first color characteristic to a second color characteristic using a color remapping model of the CRI SEI message.

In another example of processing video data, an apparatus is provided that includes a memory configured to store video data and a processor. The processor is configured to and can obtain a video bitstream, the video bitstream including a plurality of pictures having a first color characteristic. The processor is further configured to and can identify, from the video bitstream, a color remapping information (CRI) supplemental enhancement information (SEI) message. One or more values of at least one syntax element of the CRI SEI message are restricted based on a condition. The processor is further configured to and can remap one or more samples of the plurality of pictures from the first color characteristic to a second color characteristic using a color remapping model of the CRI SEI message.

In another example of processing video data, a computer readable medium is provided having stored thereon instructions that when executed by a processor perform a method that includes: obtaining a video bitstream, the video bitstream including a plurality of pictures having a first color characteristic; identifying, from the video bitstream, a color remapping information (CRI) supplemental enhancement information (SEI) message, wherein one or more values of at least one syntax element of the CRI SEI message are restricted based on a condition; and remapping one or more samples of the plurality of pictures from the first color characteristic to a second color characteristic using a color remapping model of the CRI SEI message.

In another example of processing video data, an apparatus is provided that includes means for obtaining a video bitstream, the video bitstream including a plurality of pictures having a first color characteristic. The apparatus further comprises means for identifying, from the video bitstream, a color remapping information (CRI) supplemental enhancement information (SEI) message, wherein one or more values of at least one syntax element of the CRI SEI message are restricted based on a condition. The apparatus further comprises means for remapping one or more samples of the plurality of pictures from the first color characteristic to a second color characteristic using a color remapping model of the CRI SEI message.

In some aspects, the method, apparatuses, and computer readable medium described above for processing video data may further comprise determining a chroma format of the plurality of pictures. In such aspects, the condition is the chroma format of the plurality of pictures, and the one or more values of the at least one syntax element of the CRI SEI message are restricted based on the chroma format of the plurality of pictures.

In some aspects, the method, apparatuses, and computer readable medium described above for processing video data may further comprise determining a color remap value identifying a purpose of the color remapping model of the CRI SEI message. In such aspects, the condition is the color remap value, and the one or more values of the at least one syntax element of the CRI SEI message are restricted based on the color remap value.

In some aspects, the method, apparatuses, and computer readable medium described above for processing video data may further comprise determining a chroma format of the plurality of pictures and determining a color remap value identifying a purpose of the color remapping model of the CRI SEI message. In such aspects, the condition is the chroma format of the plurality of pictures and the color remap value, and the one or more values of the at least one syntax element of the CRI SEI message are restricted based on the chroma format of the plurality of pictures and based on the color remap value.

In some aspects, the color remapping model of the CRI SEI message includes a pre-lookup table, a color remap matrix, and a post-lookup table.

In some aspects, the at least one syntax element of the CRI SEI message includes a color remap matrix present flag indicating whether the color remap matrix is present. In such aspects, the method, apparatuses, and computer readable medium described above for processing video data may further comprise: determining, based on the condition, the color remap matrix present flag is restricted to be equal to a value indicating the color remap matrix is not present; and applying the color remapping model to the one or more samples without applying the color remap matrix when the color remap matrix present flag is restricted to be equal to the value. In some examples, the condition is a chroma format of the plurality of pictures, and the color remap matrix present flag is determined to be restricted to be equal to the value when the chroma format is determined to be a 4:2:2 chroma format, a 4:2:0 chroma format, or a 4:0:0 chroma format.

In some aspects, the method, apparatuses, and computer readable medium described above for processing video data may further comprise inferring the color remap matrix as being equal to an identity matrix when the color remap matrix present flag is restricted to be equal to the value. In such aspects, applying the color remapping model to the one or more samples includes applying the identity matrix.

In some aspects, the at least one syntax element of the CRI SEI message includes a post-lookup table number syntax element indicating input and output values of the post-lookup table. In such aspects, the method, apparatuses, and computer readable medium described above for processing video data may further comprise: determining, based on the condition, the post-lookup table number syntax element is restricted to be equal to a value indicating the input and output values are equal to 0; and applying the color remapping model to the one or more samples without applying the post-lookup table when the post-lookup table number syntax element is restricted to be equal to the value.

In some aspects, the method, apparatuses, and computer readable medium described above for processing video data may further comprise inferring the post-lookup table as being an identity mapping when the post-lookup table number syntax element is restricted to be equal to the value. In such aspects, applying the color remapping model to the one or more samples includes performing the identity mapping.

In some aspects, the at least one syntax element of the CRI SEI message includes a pre-lookup table number syntax element indicating input and output values of the pre-lookup table. In such aspects, the method, apparatuses, and computer readable medium described above for processing video data may further comprise: determining, based on the condition, the pre-lookup table number syntax element is restricted to be equal to a value indicating the input and output values are equal to 0; and applying the color remapping model to the one or more samples without applying the pre-lookup table when the pre-lookup table number syntax element is restricted to be equal to the value.

In some aspects, the method, apparatuses, and computer readable medium described above for processing video data may further comprise inferring the pre-lookup table as being an identity mapping when the pre-lookup table number syntax element is restricted to be equal to the value. In such aspects, applying the color remapping model to the one or more samples includes performing the identity mapping.

According to at least one example of encoding video data, a method of encoding video data is provided that comprises obtaining video data at an encoder. The method further comprises encoding, into a video bitstream, a plurality of pictures based on the video data, the plurality of pictures having a first color characteristic. The method further comprises encoding, into the video bitstream, a color remapping information (CRI) supplemental enhancement information (SEI) message. The CRI SEI message includes a color remapping model for remapping one or more samples of the plurality of pictures from the first color characteristic to a second color characteristic. One or more values of at least one syntax element of the CRI SEI message are restricted based on a condition.

In another example of encoding video data, an apparatus is provided that includes a memory configured to store video data and a processor. The processor is configured to and can obtain video data at an encoder. The processor is further configured to and can encode, into a video bitstream, a plurality of pictures based on the video data, the plurality of pictures having a first color characteristic. The processor is further configured to and can encode, into the video bitstream, a color remapping information (CRI) supplemental enhancement information (SEI) message. The CRI SEI message includes a color remapping model for remapping one or more samples of the plurality of pictures from the first color characteristic to a second color characteristic. One or more values of at least one syntax element of the CRI SEI message are restricted based on a condition.

In another example of encoding video data, a computer readable medium is provided having stored thereon instructions that when executed by a processor perform a method that includes: obtaining video data at an encoder; encoding, into a video bitstream, a plurality of pictures based on the video data, the plurality of pictures having a first color characteristic; and encoding, into the video bitstream, a color remapping information (CRI) supplemental enhancement information (SEI) message, the CRI SEI message including a color remapping model for remapping one or more samples of the plurality of pictures from the first color characteristic to a second color characteristic, wherein one or more values of at least one syntax element of the CRI SEI message are restricted based on a condition.

In another example of encoding video data, an apparatus is provided that includes means for obtaining video data at an encoder. The apparatus further comprises means for encoding, into a video bitstream, a plurality of pictures based on the video data, the plurality of pictures having a first color characteristic. The apparatus further comprises means for encoding, into the video bitstream, a color remapping information (CRI) supplemental enhancement information (SEI) message. The CRI SEI message includes a color remapping model for remapping one or more samples of the plurality of pictures from the first color characteristic to a second color characteristic. One or more values of at least one syntax element of the CRI SEI message are restricted based on a condition.

In some aspects, the condition is a chroma format of the plurality of pictures, and the one or more values of the at least one syntax element of the CRI SEI message are restricted based on the chroma format of the plurality of pictures.

In some aspects, the condition is a color remap value identifying a purpose of the color remapping model of the CRI SEI message, and the one or more values of the at least one syntax element of the CRI SEI message are restricted based on the color remap value.

In some aspects, the condition is a chroma format of the plurality of pictures and a color remap value identifying a purpose of the color remapping model of the CRI SEI message. In such aspects, the one or more values of the at least one syntax element of the CRI SEI message are restricted based on the chroma format of the plurality of pictures and based on the color remap value.

In some aspects, the color remapping model of the CRI SEI message includes a pre-lookup table, a color remap matrix, and a post-lookup table.

In some aspects, the at least one syntax element of the CRI SEI message includes a color remap matrix present flag indicating whether the color remap matrix is present. In such aspects, the color remap matrix present flag is restricted to be equal to a value based on the condition, the value of the color remap matrix present flag indicating the color remap matrix is not present. In some examples, the condition is a chroma format of the plurality of pictures, and the color remap matrix present flag is restricted to be equal to the value when the chroma format is determined to be a 4:2:2 chroma format, a 4:2:0 chroma format, or a 4:0:0 chroma format. In some examples, the color remap matrix is inferred as being equal to an identity matrix when the color remap matrix present flag is restricted to be equal to the value.

In some aspects, the at least one syntax element of the CRI SEI message includes a post-lookup table number syntax element indicating input and output values of the post-lookup table. In such aspects, the post-lookup table number syntax element is restricted to be equal to a value based on the condition, the value of the post-lookup table number syntax element indicating the input and output values are equal to 0. In some examples, the post-lookup table is inferred as being an identity mapping when the post-lookup table number syntax element is restricted to be equal to the value.

In some aspects, the at least one syntax element of the CRI SEI message includes a pre-lookup table number syntax element indicating input and output values of the pre-lookup table. In such aspects, the pre-lookup table number syntax element is restricted to be equal to a value based on the condition, the value of the pre-lookup table number syntax element indicating the input and output values are equal to 0. In some examples, the pre-lookup table is inferred as being an identity mapping when the pre-lookup table number syntax element is restricted to be equal to the value.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 4 is an example of syntax of a CRI SEI message, in accordance with some examples.

FIG. 5 illustrates a flowchart illustrating an example of a process of processing video data, in accordance with some examples.

DETAILED DESCRIPTION

Figure 1:
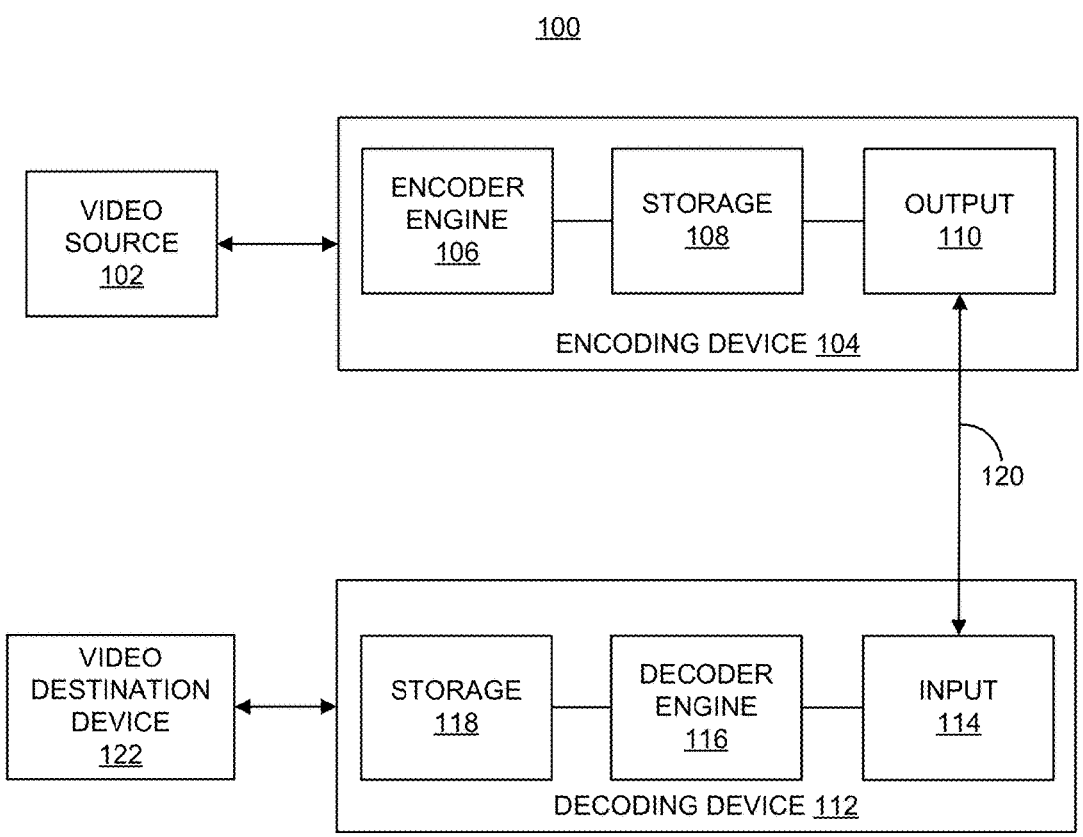
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Several systems and methods of video processing and video coding using video encoders, decoders, video players, and other video processing devices are described herein. In some examples, one or more systems and methods of processing video data are described for providing improved color remapping information (CRI) Supplemental Enhancement Information (SEI) messages. For example, a CRI SEI message can be generated that includes information defining or describing a color remapping model (including one or more lookup tables and one or more color remapping matrices), which can be applied differently for video content of different types. Values of one or more syntax elements of the CRI SEI message can be restricted or defined based on the type of video content. Details of such systems and methods are described in detail further below.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol.

Many embodiments described herein describe examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. For intra-block copy prediction, a set of motion parameters (e.g., one or more block vectors, or the like) can also be signaled for each PU and can be used for intra-block copy prediction. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 7. An example of specific details of the decoding device 112 is described below with reference to FIG. 8.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

Supplemental Enhancement Information (SEI) messages can be included in video bitstreams. In some cases, SEI messages may be used to carry information that is not essential in order to decode the bitstream by the decoder, but that can be used to improve the display or processing of the decoded output. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

In some cases, devices may have limitations that prevent the devices from processing and/or displaying video content having certain color characteristics (e.g., high dynamic range (HDR) video, wide color gamut (WCG) video, high definition video, ultra-high definition (UHD) video, using a first transfer function such as a PQ, or other characteristic). For instance, some player devices may only be able to process video having a particular color characteristic that is different than one or more color characteristics of received or decoded video content. In one illustrative example, a legacy display device may only be able to display standard dynamic range (SDR) video, standard definition video, a second transfer function such as a Gamma transfer function, or other characteristic. In another example, a legacy player device may only be able to process video having the particular color characteristic. Compatibility of newer types of video content with legacy devices is important to prevent these devices from becoming obsolete. Color characteristics of video content pictures may need to be converted so that the pictures can be processed and/or displayed by legacy player and/or display devices.

Figure 2:
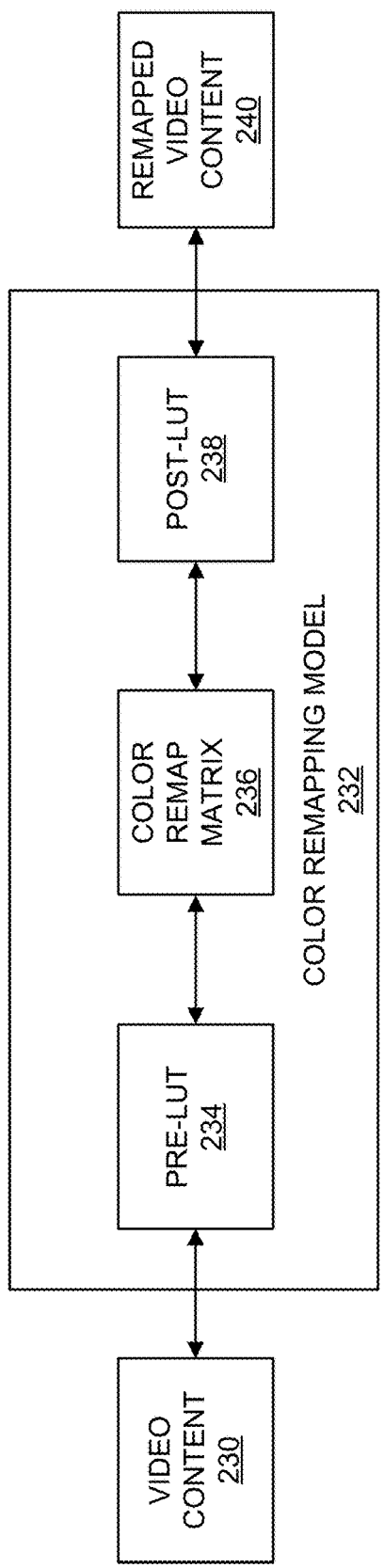
FIG. 2 is a block diagram illustrating an example of a color remapping model of a color remapping information (CRI) Supplemental Enhancement Information (SEI) message, in accordance with some examples.

The color remapping information (CRI) SEI message defined in the HEVC standard is used to convey information that is used to remap the colors of reconstructed pictures to other video formats. For instance, the CRI SEI message can be used to map or convert pictures from one color characteristic to another color characteristic. The information in the CRI SEI message can include a color remapping model. FIG. 2 illustrates an example of a color remapping model 232 of a CRI SEI message. The color remapping model 232 is defined by the syntax of the CRI SEI message. An example syntax 400 of a CRI SEI message is shown in FIG. 4 and is described below. The color remapping model 232 includes three parts—first a lookup table referred to as a pre-lookup table (pre-LUT) 234, followed by a color remap matrix 236, followed by a second lookup table referred to as a post-LUT 238. Details of the pre-LUT 234, the color remap matrix 236, and the post-LUT 238 are described below with respect to FIG. 3. The color remapping model 232 can be implemented by a video decoder (e.g., decoding device 112), by a video player that receives output from the video decoder or that receives video content from another source, by a display device, or by any other suitable client-side device. In some cases, the color remapping model 232 includes metadata that can be applied by a client-side device. In one illustrative example, once an encoded picture is received and decoded at a client-side device, the client-side device or another device can apply the metadata of the color remapping model 232 when rendering the decoded content.

The input to the color remapping model 232 includes video content 230. The video content 230 can include decoded video pictures, coded (compressed) video pictures, or video content that has not been compressed. The video content 230 has one or more color characteristics including at least a first color characteristic. The output of the color remapping model 232 includes remapped video content 240, which includes the video pictures of the video content 230 remapped from the first color characteristic to a second color characteristic.

Color characteristics of pictures can include color spaces, dynamic ranges, transfer functions, or any other color characteristic that can vary across different video content. One example of color characteristics of pictures can include color spaces. Examples of color spaces include a YCbCr color space with a Luma (Y) component, a blue difference (Cb) chroma component, and a red difference (Cr) chroma component, a red-green-blue (RGB) color space with a red (R) component, a green (G) component, and a blue (B) component, a YUV color space with luma (Y) and color (U, V) components, or other suitable color space. The color remapping model 232 of a CRI SEI message can be used to perform color space conversion by converting from a first color space to a second color space (e.g., from a YCbCr color space to an RGB color space). Another example of color characteristics of pictures can include dynamic ranges, which may include standard dynamic range (SDR), high dynamic range (HDR), or other suitable dynamic range. The color remapping model 232 can be used to perform tone mapping from a first dynamic range to a second dynamic range. In one illustrative example, source content mastered with HDR/WCG can be transformed for presentation on a display having a smaller color volume such as a SDR display. Another example of color characteristics of pictures can include transfer functions, which allow, for example, for the display of certain video content (e.g., HDR video, SDR video, or other types of video) with certain characteristics. Examples of transfer functions include a Gamma transfer function, a perceptual quantizer (PQ) transfer function, or other suitable transfer function. In one illustrative example, a PQ transfer function can allow for the display of HDR video with a luminance level of up to 10,000 cd/m2 and can be used with the BT.2020 color space. The color remapping model 232 can be used to map from one or more first transfer functions to one or more second transfer functions. One of ordinary skill will appreciate that the color remapping model 232 can be used to map other color characteristics other than those mentioned herein.

Figure 3:
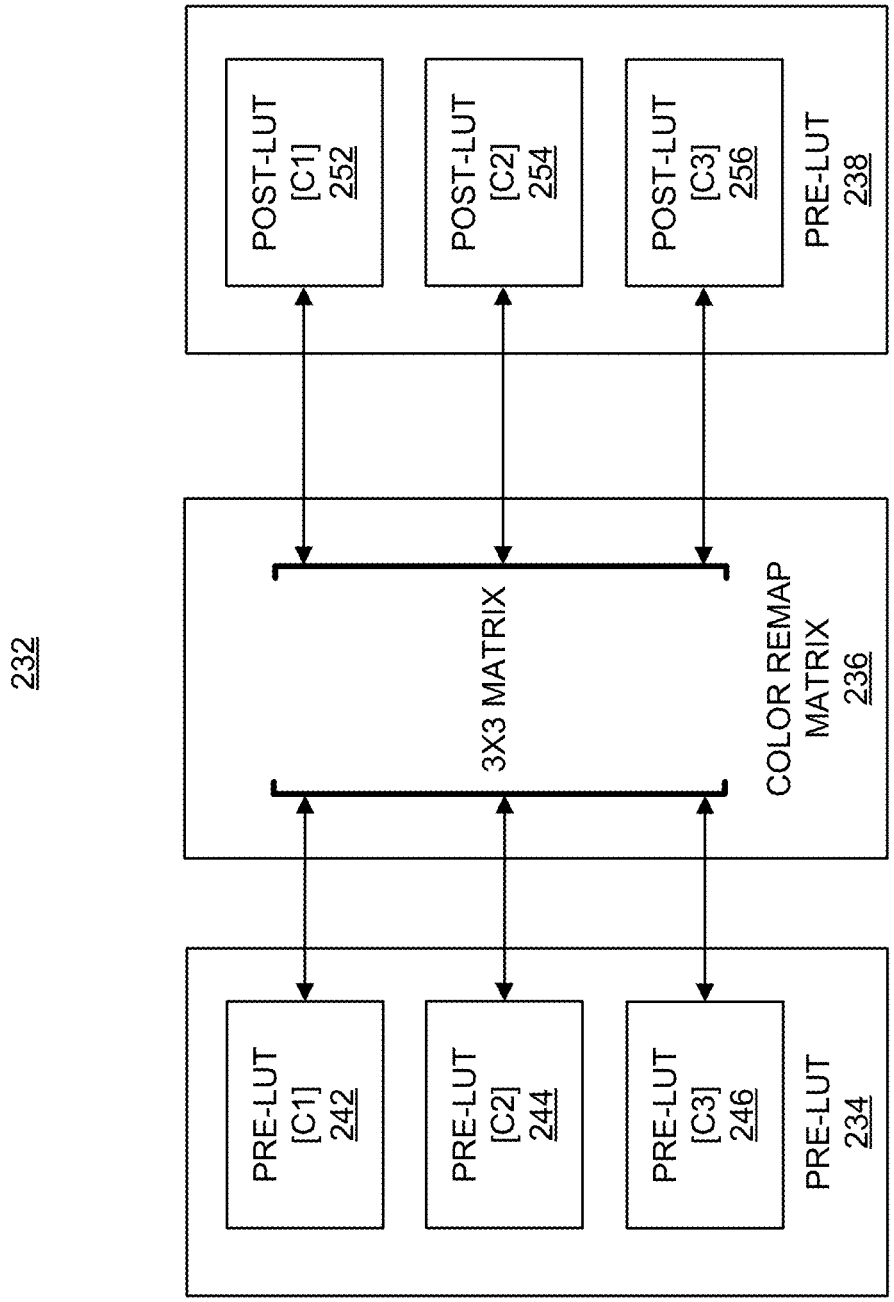
FIG. 3 is a block diagram illustrating details of components of a color remapping model of a CRI SEI message, in accordance with some examples.

FIG. 3 illustrates details of the pre-LUT 234, the color remap matrix 236, and the post-LUT 238 the color remapping model 232. The pre-LUT 234 can include an independent pre-LUT defined for each color component of the pictures of the video content 230, such as for each of the R, G, and B components of the RGB color space, for each of the Y, Cb, and Cr components of the YCbCr color space, for each of the Y, U, and V components of the YUV color space, or for color components of any other suitable color space. Pre-LUT [C1] 242 can be defined for a first color component C1, pre-LUT [C2] 244 can be defined for a second color component C2, and pre-LUT [C3] 246 can be defined for a third color component C3.

Each of the pre-LUTs can be a one-dimensional (1D) LUT and can include a first piece-wise linear function (or transformation) for each color component of one or more samples of a picture (e.g., each pixel of a picture). For example, a piece-wise linear function of pre-LUT[C1] 242 can transform the color component C1 of an input picture having a first color characteristic. In one illustrative example, the pre-LUT[C1] 242 can compress or decompress a Y color component of a sample having Y, Cb, and Cr color components. In certain video content, one or more color components may occupy value ranges that are small due to the container that is used (e.g., mapping content that is restricted to BT.709 colour gamut in a BT.2020 container may result in components occupying a smaller range than the allowed value range); mapping this video range at the encoder using a piece-wise linear function to increase the value range of components may help in improving the coding efficiency. When such mapping is performed, the pre-LUT, and the piece-wise linear mapping function defined therein, may be used to map these components back to original value ranges at the client-side device.

In some examples, the color remap matrix 236 can include a linear model, such as a 3×3 matrix when three color components are present. In one illustrative example, the color remap matrix 236 includes a 3×3 matrix with color remapping coefficients. The color remap matrix 236 is applied across all color components of each picture sample and is used to map the coefficients of the color components. For example, the color remap matrix 236 can be used to convert from one color space (e.g. YCbCr) to another color space (e.g. RGB), from one color volume (e.g., HDR) to another color volume (e.g., SDR), or the like. In one illustrative example, the color remap matrix 236 can be applied to the mapped color components to compensate for the decorrelation between the color components. Decorrelation between color components may increase coding efficiency. For instance, compressing many sequences in the decorrelated YCbCr color space is more efficient than compressing the sequences in an RGB color space. Content that is converted to the YCbCr domain may need to be converted back to the RGB domain and the color remap matrix 236 can be applied to perform this conversion.

Similar to the pre-LUT 234, the post-LUT 238 can include an independent post-LUT defined for being applied to each resulting color component after application of the color remap matrix 236 (each color component of the pictures of the remapped video content 240). For example, post-LUT [C1] 252 can be defined for a first color component C1, post-LUT [C2] 254 can be defined for a second color component C2, and post-LUT [C3] 256 can be defined for a third color component C3. Each post-LUT can be a 1D LUT including a second piece-wise linear function (or transformation) for each color component of one or more samples of a picture. For example, a piece-wise linear function of post-LUT[C1] 252 can transform the color component C1 of a remapped output picture having a second color characteristic. In one illustrative example, the post-LUT[C1] 252 can compress or decompress a R color component of a sample having R, G, and B color components, where the sample is part of a picture that is mapped from a YCbCr color space to the RGB color space. In another example, decompression of one or more of R, G, B color components may be performed to compensate a compression that may be performed at an encoder to improve the coding efficiency; in some video content, sample values occupying certain value range of one or more of R, G, B color components may correspond to a content that may not affect the visual quality of the sequences and these value ranges may be compressed to improve the coding efficiency. In another example, the post-LUT may also be used to apply the transfer function associated with the video content; the transfer function is typically applied to each R, G, B component independently. Color remapping of the output pictures for the display process (which is outside the scope of the HEVC Specification) is optional and does not affect the decoding process specified in the HEVC Specification. However, application standards may define the color remapping process to be mandatory to be conforming to that particular standard.

A piece-wise linear function is defined by intervals $[X_i; X_{i+1}]$ and is linear in each interval. The parameters of the piece-wise linear functions of the pre-LUT 234 and the post-LUT 238, as well as the parameters of the color remap matrix 236, are determined based on the purpose of the particular CRI SEI message (e.g., for converting from HDR to SDR content, for converting from one color space to another color space, for mapping from one transfer function to another transfer function, or any other suitable purpose). The parameters are defined in the syntax and semantics of the CRI SEI message. These parameters can be determined as defined by the particular Application Standard or video coding Standard for which the purpose of the CRI SEI message applies, as known by one of ordinary skill.

FIG. 4 is an example of a syntax 400 of a CRI SEI message. The syntax 400 of a CRI SEI message, along with the semantics described below, defines the color remapping model 232. The syntax 400 includes syntax elements 462 for Pre-LUTs, followed by syntax elements 464 for a matrix (e.g., a 3×3 matrix or other matrix of a size based on the number of color components) indicating color remapping coefficients, followed by syntax elements 466 for Post-LUTs. For example, the syntax 400 includes a "pre" set of syntax elements 462 that may be used to construct the first piece-wise linear function of the pre-LUT applied to each color component, syntax elements 464 for a 3×3 matrix that may be applied to all three color components, and a "post" set of syntax elements 466 that may be used to reconstruct a second piece-wise linear function of the post-LUT applied to each color component. For both the pre-LUT and the post-LUT, an independent LUT is defined for each color component (e.g. R, G, B or Y, Cb, Cr or Y, U, V or any other suitable color space components).

The syntax elements pre_lut_num_val_minus1[c], pre_lut_coded_value[c][i] and pre_lut_target_value[c][i] can be used to represent the pre-LUTs. The "c" term indicates the number of color components of a picture. For example, there are three color components in the RGB color space and in the YCbCr color space. In one illustrative example, c equal to 0 refers to the first component (e.g., Y in the YCbCr color space, G in the RGB color space, or the like), c equal to 1 refers to the second component (e.g., Cb, B, or the like), and c equal to 2 refers to the third component (e.g., Cr, R, or the like). A piece-wise linear curve of the pre-LUT for a particular color component can map the color component from value x (of an input picture) to value y (of a target picture). The piece-wise linear curve can be constructed with pivot points that are linearly connected. Linear interpolation is used to map values between two pivot points. Each pivot point is defined by the syntax elements pre_lut_coded_value[c][i] and pre_lut_target_value[c][i]. For example, the syntax element pre_lut_num_val_minus1 [c] indicates the number of pivot points in the piece-wise linear remapping function for the c-th color component, the syntax element pre_lut_coded_value[c][i] specifies the value of the i-th pivot point for the c-th component of the input picture, and the syntax element pre_lut_target_value [c][i] specifies the value of the i-th pivot point for the c-th component of the target picture.

The syntax elements log 2_matrix_denom and colour_remap_coeffs[c][i] can be used to represent the matrix. The syntax element log 2_matrix_denom specifies the base 2 logarithm of the denominator for all matrix coefficients. The syntax element colour_remap_coeffs[c][i] specifies the value of the color remapping matrix coefficients. The syntax element colour_remap_matrix_present_flag indicates whether the matrix syntax elements are present or not. For example, colour_remap_matrix_present_flag equal to 1 can be used to indicate that the syntax elements log 2_matrix_denom and colour_remap_coeffs[c][i] are present and a 0 value can indicate that the syntax elements are not present.

The syntax elements post_lut_num_val_minus1[c], post_lut_coded_value[c][i] and post_lut_target_value[c][i] can be used to represent the post-LUTs. Similar to the pre-LUTs, the post_LUTs include a piece-wise linear curve. Each pivot point of the curve is defined by the syntax elements post_lut_coded_value[c][i] and post_lut_target_value[c][i], and linear interpolation is used to map values between two pivot points. The syntax element post_lut_num_val_minus1[c] indicates the number of pivot points in the piece-wise linear remapping function for the c-th color component, the syntax element post_lut_coded_value[c] [i] specifies the value of the i-th pivot point for the c-th component of the input picture, and the syntax element post_lut_target_value[c][i] specifies the value of the i-th pivot point for the c-th component of the target picture.

The CRI SEI message syntax 400 also includes a syntax element called colour_remap_id, different values of which may be used to indicate different purposes of the CRI SEI message (e.g., for converting from one color space to another color space, for converting from HDR to SDR content, for mapping from one transfer function to another transfer function, or any other suitable purpose). The term "color" is also written herein as "colour," which is the spelling used in the HEVC standard.

The syntax element colour_remap_cancel_flag (referred to as a "cancel flag") indicates whether a current CRI SEI message cancels the persistence of any previous CRI SEI message. In one illustrative example, colour_remap_cancel_flag equal to 1 can indicate that a CRI SEI message cancels the persistence of any previous CRI SEI message in output order that applies to the current layer, and colour_remap_cancel_flag equal to 0 can indicate that color remapping information follows. The cancel flag can thus indicate whether the client-side device should cancel previously signaled CRI SEI message or not when a new CRI SEI is received.

The syntax element colour_remap_persistence_flag (referred to as a "persistence flag") specifies the persistence of a CM SEI message. For example, the persistence flag can be used to indicate whether to apply a CRI SEI message to just the current picture or to the current picture and subsequent pictures until a defined point in the future. In one illustrative example, the colour_remap_persistence_flag equal to 0 can specify that the CRI SEI message applies to the current picture only, and a value of 1 can specify that the CRI persists (e.g., for the current layer) in output order until a condition is met. The conditions can be defined by the semantics.

The syntax element colour_remap_video_signal_info_present_flag indicates whether the following four syntax elements are present or not: colour_remap_full_range_flag; colour_remap_primaries; colour_remap_transfer_function; and colour_remap_matrix_coefficients. These four syntax elements indicate the characteristic of the output after performing the color remapping using the color remapping model. For example, the syntax element colour_remap_full_range_flag indicates whether, at the end of the remapping using the remapping model, a full range data will be achieved (e.g., from 0-255 in an 8-bit representation). For instance, when a detailed representation is represented in 8 bits, values between 0-255 can be used. An example of a full range would be assigning 0 as the black and 255 as the white. In some cases, applications may not use the full range of values from 0-255 to indicate the video, and instead may use a narrow range (e.g., values from 16 to 240, with a value of 16 being black and a value of 240 being white). Any value outside of the narrow range may not considered for legal data.

The syntax element colour_remap_primaries indicates the primary color coordinates (e.g., R, G, B primary coordinates, Y, Cb, Cr primary coordinates, or the like) that would be used to define the output of the color remapping information process. For example, this syntax element can indicate the chromaticity coordinates of the remapped reconstructed pictures. The syntax element colour_remap_transfer_function indicates the transfer function characteristic that would be applicable to the remapped reconstructed pictures (e.g., whether the transfer function is a Gamma curve, a PQ curve, or other suitable transfer function). For example, the transfer function syntax element can indicate the transfer function the client-side device should use to correctly process and/or display the output of the color remapping information. The syntax element colour_remap_matrix_coefficients indicates the coefficients of the remapped reconstructed pictures. For example, this syntax element can describes the matrix coefficients used in deriving luma and chroma signals from the green, blue, and red, or Y, Z, and X primaries. As another example, this syntax element can indicate whether the output is RGB or YCbCr.

The syntax element colour_remap_input_bit_depth is the input bit depth used to signal pre-LUT coded value. For example, the input bit depth syntax element specifies the bit depth of the color components of the associated pictures for purposes of interpretation of the CRI SEI message. The syntax element colour_remap_output_bit_depth is the output bit depth for pre-LUT target value, post-LUT coded value, and post-LUT target value. For example, the output bit depth syntax element specifies the bit depth of the output of the color remapping function described by the CRI SEI message.

More detailed descriptions of the syntax elements and of the semantics of the CRI SEI message are provided below with reference to the HEVC Standard.

Various problems are associated with the existing CRI SEI message specified in the HEVC Standard. For example, one problem is that the semantics of the SEI message specify that the processes described by the CRI SEI message (e.g., the LUTs and matrix multiplication) may only be applied to 4:4:4 decoded samples, and if the decoded samples are in the 4:2:0 or the 4:2:2 domain, they would have to be upsampled from the respective domains to the 4:4:4 domain. For example, the semantics state that the input to the indicated remapping process is the set of decoded sample values after applying an (unspecified) upsampling conversion process to the 4:4:4 color sampling format as necessary when chroma_format_idc is equal to 1 (4:2:0 chroma format) or 2 (4:2:2 chroma format). According to the HEVC standard, a chroma_format_idc is equal to 0 indicates a monochrome (4:0:0) chroma format, a chroma_format_idc is equal to 1 indicates a 4:2:0 chroma format, a chroma_format_idc is equal to 2 indicates a 4:2:2 format, and a chroma_format_idc is equal to 3 indicates a 4:4:4 format. However, there are several reasons to apply the CRI SEI message directly on the decoded samples (e.g. in the 4:2:0 domain or the 4:2:2 domain) without upsampling the pictures. For example, the coding quality of HDR video can be improved if linear mapping is applied on the three color components of the signal. The first functional component of the CRI SEI provides this with the LUT functionality. Constraining the functionality to be applied on the 4:4:4 domain may need changes to some workflow environments where upsampling and processing in the 4:4:4 domain is performed by a separate block or device. Allowing the LUT to be applied directly on the 4:2:0 domain may not necessitate such changes.

Another problem associated with the existing CRI SEI message is that the semantics of the CRI SEI message do not specify the use of the CRI message when the video is coded in the monochrome domain. For example, the semantics state that, when color_format_idc is equal to 0 (monochrome), the CRI SEI message shall typically not be present, although decoders typically shall allow such messages to be present and shall ignore any such CRI SEI messages that may be present. This places unnecessary restrictions on use cases where it may be beneficial to apply the CRI message (e.g. only certain parts that do not need the identity matrix) for certain monochrome signals. For example, it would be beneficial to apply the scaling for better preserving the video quality of the monochrome video containing only luma values if a linear mapping (indicated using the CRI message) is applied.

Yet another problem associated with the existing CRI SEI message is that the semantics of the color_remap_id syntax element (also referred to herein as a "color remap value") specifies that the value of the color_remap_id may be utilized in order to identify the purpose of the color remapping function. Several use cases of the CRI SEI message have been specified, and not specifying to what domain and/or purpose the various values of the color_remap_id apply may make it extremely difficult, as each application space may use different ID values. Moreover, since cascading of CRI messages is permitted, this could lead to cases where the order of IDs with which the SEI message are to be applied are incompatible across different application spaces.

Another problem associated with the existing CRI SEI message is that the semantics of the SEI message are written in such a manner that they are restricted to be applied in the RGB and YCbCr color spaces. However, the HEVC codec allows several color spaces (as currently specified in the Video Usability Information (VUI) or in the future) or even unspecified color spaces that only an application may understand. In such cases, it is restrictive to only allow a CRI SEI message to be applicable to the RGB and YCbCr color spaces. In some cases, the coded bitstream may be in an unspecified color space and application of the CRI SEI message may convert the video back into another color space such as YCbCr or RGB.

Systems and methods are described herein to improve the design and application of the CRI SEI message or possible derivation, or similar SEI signaling and processing, which is specified or to be specified in video coding standards, such as H.265/HEVC, H.264/AVC, BDA, MPEG or others specified in the H.265/HEVC video coding standard. In some instances, the systems and methods better enable color remapping information SEI message for HDR video or other type of video. One or more of these methods may be applied independently, or in combination with others.

In some embodiments, changes to the semantics of the SEI message are described such that an SEI message can be used for coding 4:2:0 YCbCr coded video content or formats other than 4:4:4 decoded samples. For example, the semantics of the CRI SEI message are modified such that the CRI message may be applicable to the video data represented in 4:2:0 domain or 4:0:0 chroma subsampling format. In some examples, the semantics of the SEI message are modified such that the CRI message may be applicable to the video data represented in 4:2:2 domain. Embodiments are provided below that include changes to the HEVC standard so that the CRI message may be applicable to the video data represented in 4:2:0 domain, the 4:0:0 chroma subsampling format, or the 4:2:2 domain.

As previously described, the HEVC standard specifies that the color remapping model described by the CRI SEI message (e.g., the LUTs and matrix multiplication) may only be applied to 4:4:4 decoded samples. When decoded samples are in the 4:2:0 domain or the 4:2:2 domain, these samples must be upsampled from the respective domains to the 4:4:4 domain. However, it would be beneficial to apply the color remapping model directly to the samples in the 4:2:0 domain, the 4:2:2 domain, and even in the 4:0:0 (monochrome) domain. The terminology for the different domains is a ratio that is typically based on four luma values, taking the form 4:a:b, where a and b are the relative number of chroma values for rows or lines of a conceptual 4×2 pixel block. For example, for samples in the 4:4:4 domain, each of the three color components (e.g., YCbCr components, RGB components, or the like) have the same sample rate, thus there is no chroma subsampling. The 4:4:4 domain can be used, for example, in high-end film scanners, cinematic post production, or other high quality video. In the 4:2:2 domain, the two chroma components Cb and Cr (for YCbCr) are sampled at half the sample rate of luma (Y) component. For example, the horizontal chroma resolution is halved. That is, 4:2:2 each horizontal scanline has two chroma values for every four luma values. Such reduction in the chroma resolution can reduce the bandwidth of an uncompressed video signal by one-third with little to no visual difference. The 4:2:0 domain can be used, for example, by high-end digital video formats. For samples in the 4:2:0, there are two of each chroma sample (Cb, Cr) per scanline, but these are only present every other line. Since the Cb and Cr channels are only sampled on each alternate line in this scheme, the vertical resolution is halved. The horizontal resolution is also halved in the 4:2:0 domain. The channel from the skipped line can be recovered from the previous line, or a combination of one or more nearby lines. In some examples, the pixel location of Cb and Cr components may be shifted with respect pixel location of Y.

The 4:2:0 domain, 4:2:2 domain, and the 4:0:0 domain thus have fewer samples than the 4:4:4 domain, so you have fewer color components overall in the samples of a picture. If a system can apply the color remapping model in the 4:2:0 domain, for example, the system can be more efficient since the model is applied to many less samples than if applied to samples in the 4:4:4 domain. For example, in the 4:2:0 domain, the number of Cb and Cr samples are one quarter of the number of luma (Y) samples.

Certain parts of the color remapping model may not be applicable when a domain other than 4:4:4 is used. For example, as described above, the color remap matrix (e.g., a 3×3 matrix when three color components are present) is applied across all color components of a sample. Because the matrix coefficients are applies across all the components, the model will expect a Y value, a Cb value, and a Cr value, and will attempt to apply the matrix on these three values. However, in the 4:2:0 domain, for example, all three color components will be present for only one quarter of the samples (e.g., pixels) in the picture. Only a Y component will be present for the other samples in the picture (no Cb and Cr components will be present).

Various techniques can be used to provide a CRI SEI message that it is applicable to various types of video content, such as video pictures in the 4:2:0, 4:2:2, or 4:0:0 domain. In some examples, the semantics and the values of some of the CRI SEI message syntax elements can be restricted based on the chroma format of a picture and/or based on the value of the color_remap_id, which specifies the purpose of the CRI SEI message as described above. In such examples, one or more of the pre-LUT, the color remap matrix, and/or the post-LUT can be modified or removed for certain types of video content. For example, a pre-LUT may be applied to each component of a sample in a picture (one 1D lookup table for each color component), but not the color remap matrix or the post-LUT. In another example, the post-LUT may be applied to each component of a sample in a picture (one 1D lookup table for each color component), but not the color remap matrix or the pre-LUT.

In one illustrative example using the terminology of the syntax 400, for video pictures having a certain chroma format or for certain values of the color_remap_id, the value of color_remap_matrix_present_flag can be restricted to be equal to 0 and the values of post_lut_num_val_minus1[c] can be restricted to be equal to 0. In some examples, the 3×3 matrix is inferred to be equal to the identity matrix when the color_remap_matrix_present_flag is restricted to be equal to 0, and the application of the matrix multiplication may not be applied. In some examples, the post-LUT is also inferred to be identity mapping when the values of post_lut_num_val_minus1[c] are restricted to be equal to 0. An example of the chroma format that would invoke implementation of such a restriction can be video pictures in the 4:2:0 domain, the 4:2:2 domain, or the 4:0:0 domain. For example, the color remap matrix may not be applied since certain samples of a picture will not have all three color components, as described above. In some examples, the value range of one or more of the Y, Cb, or Cr components may be modified to improve the coding efficiency. When video content is represented in HDR content containers such as BT.2020 or BT.2100, the video occupies a very small part of the value range. Coding this content may result in coding artifacts that may be reduced if the value range occupied by the components is increased by expanding the value range using a piece-wise linear mapping. The pre-LUT tables may be used to compensate this mapping by compressing the values back to the original value range. In another example, the pre-LUT may be applied to Y, Cb, Cr components in order to convert the representation from HDR to SDR characteristic. In both examples above, the pre-LUT mapping may be applied directly on the 4:2:0 domain rather than 4:4:4 domain as it would require fewer mapping operations.

In another illustrative example, for video pictures having a certain chroma format or for certain values of the color_remap_id, the pre-LUT is inferred to be equal to identity mapping by setting pre_lut_num_val_minus1[c] equal to 0, the value of color_remap_matrix_present_flag is restricted to be equal to 0, and the post-LUT is used to map the components of the samples in the pictures. In some examples, an additional bit shift operations may be performed in this case to match the bit depth specified by the LUT. For instance, if the input bit depth does not match the bit depth of the output signal (the output bit depth), the client-side device can perform an additional bit shift operation before applying the post-LUT so that the output bit depth is satisfied.

In some examples, instead of specifying that the color remap matrix (and/or one of the pre- or post-LUTs) is not applied, the matrix can be applied on a first component of the sample values when all components are not present for a sample. For samples that have all three components, the matrix can be applied to the values of the components.

However, for a sample that has a value for a first component (e.g., a Y component) but has no collocated sample values of the other collocated components (e.g., in 4:2:0 domain pictures, 4:2:2 domain pictures, or the like), the color remap matrix can be applied on the first component and fixed values for the other collocated component values can be assumed. As used herein, collocated indicates components and component values of the same sample (e.g., all components of a sample are collocated components). In one illustrative example, for a particular sample, there may be a luma (Y) component, but no chroma (Cb or Cr) components. The color remap matrix can be applied to the sample using the Y component value and assumed values for the chroma components. The fixed values can include, for example, $2^{color\_remap\_output\_bit\_depth}-1$. In some examples, the values of one or more collocated components that are not present in a given sample are derived or taken to be equal to the value of a corresponding component in a neighboring sample. For example, a sample located at a pixel location of (0,3) in a picture may have a Y component value and no values for the Cb and Cr components. The values of the Cb and Cr components of the (0,3) sample can be taken to be equal to the Cb and Cr component values of the (0,4) sample, which has values for all three color components. The color remap matrix can then be applied to the Y value and the derived Cb and Cr values of the (0,3) sample. In some examples, the value of the collocated component value that is not present for a particular sample may be derived from more than one neighboring sample.

In some embodiments, for certain values of the color_remap_id, a value of color_remap_output_bit_depth is inferred to be equal to color_remap_input_bit_depth. For instance, if only the pre-LUT or the post-LUT is going to be applied, the input and output bit depth can be inferred to be equal.

In some embodiments, changes to the semantics of the CRI SEI message are described such that an CRI SEI message can be used for mapping monochrome video content. For example, the semantics of the CRI SEI message can be modified such that the CRI SEI message is also applicable to monochrome signals.

In some embodiments, the semantics of the CRI SEI message are modified such that the CRI SEI message is not restricted to be applied to YCbCr and RGB color spaces. For example, the semantics can be modified so that the CRI SEI message is also applicable to other color spaces that may be specified by the VUI or other unspecified color spaces. In some examples, the values of the color_remap_id may be used to indicate the first, second, and third components.

The changes described above could be implemented as changes to the HEVC Standard, or can be implementations of certain Application standards.

Various embodiments are now described with modifications to the HEVC standard to implement the changes described above. The changes are with respect to Document JCTVC-W1005 v2 by the Joint Collaborative Team on Video Coding (JCT-VC) of ITU-T SG 16 WP 3 and ISO/IEC JTC 1/SC 29/WG 11, which is hereby incorporated by reference, in its entirety for all purposes. Addition to the syntax and semantics are indicated in between "<insert>" and "<insertend>" symbols (e.g., "<insert>added text<insertend>") and deletions are shown in between "<delete>" and "<deleteend>" symbols (e.g., "<insert>added text<insertend>"):

Configurations to depict usage of color remapping information in post-processing chain This section provides several configurations that could be used to implement/apply the color remapping information.

Color remapping information SEI message semantics

The color remapping information SEI message provides information to enable remapping of the reconstructed color samples of the output pictures. The input to the indicated remapping process <insert> is specified based on the value of the identifier specified in the SEI message. For some values of identifier, the input<insertend> is the set of decoded sample values after applying an (unspecified) upsampling conversion process to the 4:4:4 color sampling format as necessary when chroma_format_idc is equal to 1 (4:2:0 chroma format) or 2 (4:2:2 chroma format). <insert> For some values of identifier, the input is the set of the decoded samples and when the chroma_format_idc is not equal to 0, some processes specified in the CRI message are restricted.<insertend> When color_format_idc is equal to 0 (monochrome), the color remapping information SEI message <insert> is only applied for the component that is present, and some processes of the CRI SEI message are restricted.<insertend><delete> shall not be present, although decoders shall allow such messages to be present and shall ignore any such color remapping information SEI messages that may be present.<deleteend>

The color remapping model used in the color remapping information SEI message is composed of a first piece-wise linear function applied to each color component (specified by the "pre" set of syntax elements herein), followed by a three by-three matrix applied to the three resulting color components, followed by a second piece-wise linear function applied to each resulting color component (specified by the "post" set of syntax elements herein).

NOTE 1—Color remapping of the output pictures for the display process (which is outside the scope of this Specification) is optional and does not affect the decoding process specified in this Specification.

color_remap_id contains an identifying number that may be used to identify the purpose of the color remapping information. When more than one color remapping information SEI message is present with the same value of color_remap_id, the content of these color remapping information SEI messages shall be the same. When color remapping information SEI messages are present that have more than one value of color_remap_id, this indicates that the remapping processes indicated by the different values of color_remap_id are alternatives that are provided for different purposes (not that a cascading of remapping processes is to be applied). The value of color_remap_id shall be in the range of 0 to $2^{32}-2$, inclusive.

Values of color_remap_id from 0 to 255 and from 512 to $2^{31}-1$ may be used as determined by the application. Values of color_remap_id from 256 to 511, inclusive, and from $2^{31}$ to $2^{32}-2$, inclusive, are reserved for future use by ITU-T|ISO/IEC. Decoders shall ignore all color remapping information SEI messages containing a value of color_remap_id in the range of 256 to 511, inclusive, or in the range of $2^{31}$ to $2^{32}-2$, inclusive, and bitstreams shall not contain such values.

<insert> When the value of chroma_format_idc is not equal to 1, the value color_remap_id shall not be in the range of is equal to 256 to 287, inclusive.

When the value of chroma_format_idc is not equal to 2, the value color_remap_id shall not be in the range of is equal to 288 to 319, inclusive.

When the value of chroma_format_idc is not equal to 0, the value color_remap_id shall not be in the range of is equal to 320 to 351, inclusive.

When the value of chroma_remap_id is in the range of 256 to 287, inclusive, the value of color_remap_matrix_present_flag shall be equal to 0 and the value of post_lut_num_val_minus1[c] shall be equal to 0 for c in the range of 0 to 2, respectively. The three-by-three matrix and the post-LUT is not applied to the samples.

When the value of chroma_remap_id is in the range of 288 to 319, inclusive, the value of color_remap_matrix_present_flag shall be equal to 0 and the value of post_lut_num_val_minus1[c] shall be equal to 0 for c in the range of 0 to 2, respectively. The three-by-three matrix and the post-LUT is not applied to the samples.

When the value of chroma_remap_id is in the range of 320 to 351, inclusive, the value of color_remap_matrix_present_flag shall be equal to 0 and the value of post_lut_num_val_minus1[c] shall be equal to 0 for c in the range of 1 to 2, respectively. The three-by-three matrix is not applied and the post-LUT for the second and third components are not applied.<insertend>

NOTE 2—The color_remap_id can be used to support different color remapping processes that are suitable for different display scenarios. For example, different values of color_remap_id may correspond to different remapped color spaces supported by displays.

color_remap_cancel_flag equal to 1 indicates that the color remapping information SEI message cancels the persistence of any previous color remapping information SEI message in output order that applies to the current layer. color_remap_cancel_flag equal to 0 indicates that color remapping information follows.

color_remap_persistence_flag specifies the persistence of the color remapping information SEI message for the current layer.

color_remap_persistence_flag equal to 0 specifies that the color remapping information applies to the current picture only.

Let picA be the current picture. color_remap_persistence_flag equal to 1 specifies that the color remapping information persists for the current layer in output order until either of the following conditions is true:

A new CLVS of the current layer begins.

The bitstream ends.

A picture picB in the current layer in an access unit containing a color remapping information SEI message with the same value of color_remap_id and applicable to the current layer is output for which PicOrderCnt (picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

color_remap_video_signal_info_present_flag equal to 1 specifies that syntax elements color_remap_full_range_flag, color_remap_primaries, color_remap_transfer_function and color_remap_matrix_coefficients are present, color_remap_video_signal_info_present_flag equal to 0 specifies that syntax elements color_remap_full_range_flag, color_remap_primaries, color_remap_transfer_function and color_remap_matrix_coefficients are not present.

color_remap_full_range_flag has the same semantics as specified in clause E.3.1 for the video_full_range_flag syntax element, except that color_remap_full_range_flag identifies the color space of the remapped reconstructed picture, rather than the color space used for the CLVS. When not present, the value of color_remap_full_range_flag is inferred to be equal to the value of video_full_range_flag.

color_remap_primaries has the same semantics as specified in clause E.3.1 for the color_primaries syntax element, except that color_remap_primaries identifies the color space of the remapped reconstructed picture, rather than the color space used for the CLVS. When not present, the value of color_remap_primaries is inferred to be equal to the value of color_primaries.

color_remap_transfer_function has the same semantics as specified in clause E.3.1 for the transfer_characteristics syntax element, except that color_remap_transfer_function identifies the color space of the remapped reconstructed picture, rather than the color space used for the CLVS. When not present, the value of color_remap_transfer_function is inferred to be equal to the value of transfer_characteristics.

color_remap_matrix_coefficients has the same semantics as specified in clause E.3.1 for the matrix_coeffs syntax element, except that color_remap_matrix_coefficients identifies the color space of the remapped reconstructed picture, rather than the color space used for the CLVS. When not present, the value of color_remap_matrix_coefficients is inferred to be equal to the value of matrix_coeffs.

color_remap_input_bit_depth specifies the bit depth of the color components of the associated pictures for purposes of interpretation of the color remapping information SEI message. When any color remapping information SEI message is present with the value of color_remap_input_bit_depth not equal to the bit depth of the decoded color components, the SEI message refers to the hypothetical result of a conversion operation performed to convert the decoded color component samples to the bit depth equal to color_remap_input_bit_depth.

The value of color_remap_input_bit_depth shall be in the range of 8 to 16, inclusive. Values of color_remap_input_bit_depth from 0 to 7, inclusive, and from 17 to 255, inclusive, are reserved for future use by ITU-T|ISO/IEC. Decoders shall ignore all color remapping SEI messages that contain a color_remap_input_bit_depth in the range of 0 to 7, inclusive, or in the range of 17 to 255, inclusive, and bitstreams shall not contain such values.

color_remap_output_bit_depth specifies the bit depth of the output of the color remapping function described by the color remapping information SEI message.

The value of color_remap_output_bit_depth shall be in the range of 8 to 16, inclusive. Values of color_remap_output_bit_depth from 0 to 7, inclusive, and in the range of 17 to 255, inclusive, are reserved for future use by ITU-T|ISO/IEC. Decoders shall ignore all color remapping SEI messages that contain a value of color_remap_output_bit_depth from 0 to 7, inclusive, or in the range of 17 to 255, inclusive.

pre_lut_num_val_minus1[c] plus 1 specifies the number of pivot points in the piece-wise linear remapping function for the c-th component, where c equal to 0 refers to the <delete>luma or G<deleteend><insert>first<insertend> component, c equal to 1 refers to the <delete>Cb or B<deleteend><insert>second<insertend> component, and c equal to 2 refers to the <delete>Cr or R<deleteend><insert>third<insertend> component. When pre_lut_num_val_minus1[c] is equal to 0, the default end points of the input values are 0 and $2^{color\_remap\_input\_bit\_depth}-1$, and the corresponding default end points of the output values are 0 and $2^{color\_remap\_output\_bit\_depth}-1$, for the c-th component. In bitstreams conforming to this version of this Specification, the value of pre_lut_num_val_minus1[c] shall be in the range of 0 to 32, inclusive.

pre_lut_coded_value[c][i] specifies the value of the i-th pivot point for the c-th component. The number of bits used to represent pre_lut_coded_value[c][i] is ((color_remap_input_bit_depth+7)>>3)<<3.

pre_lut_target_value[c][i] specifies the value of the i-th pivot point for the c-th component. The number of bits used to represent pre_lut_target_value[c][i] is ((color_remap_output_bit_depth+7)>>3)<<3.

When pre_lut_coded_value[c][0] is greater than 0, an initial linear segment should be inferred that maps input values ranging from 0 to pre_lut_coded_value[c][0], inclusive, to target values ranging from 0 to pre_lut_target_value[c][0], inclusive.

When pre_lut_coded_value[c][pre_lut_num_val_minus1[c]] is not equal to $2^{color\_remap\_input\_bit\_depth}-1$, a final linear segment should be inferred that maps input values ranging from pre_lut_coded_value[c][pre_lut_num_val_minus1[c]] to $2^{color\_remap\_input\_bit\_depth}-1$, inclusive, to target values ranging from 0 to $2^{color\_remap\_output\_bit\_depth}-1$, inclusive.

color_remap_matrix_present_flag equal to 1 indicates that the syntax elements log 2_matrix_denom and color_remap_coeffs[c][i], for c and i in the range of 0 to 2, inclusive, are present. color_remap_matrix_present_flag equal to 0 indicates that the syntax elements log 2 matrix_denom and color_remap_coeffs[c][i], for c and i in the range of 0 to 2, inclusive, are not present.

log 2_matrix_denom specifies the base 2 logarithm of the denominator for all matrix coefficients. The value of log 2_matrix_denom shall be in the range of 0 to 15, inclusive. When not present, the value of log 2_matrix_denom is inferred to be equal to 0.

color_remap_coeffs[c][i] specifies the value of the three-by-three color remapping matrix coefficients. The value of color_remap_coeffs[c][i] shall be in the range of $-2^{15}$ to $2^{15}-1$, inclusive. When color_remap_coeffs[c][i] is not present, it is inferred to be equal to 1 if c is equal to i, and inferred to be equal to 0 otherwise.

NOTE 3—When color_remap_matrix_present_flag is equal to 0, the color remapping matrix is inferred to be equal to the identity matrix of size 3×3.

The variable matrixOutput[c] for c=0, 1 and 2 is derived as follows:

roundingOffset=log 2_matrix_denom==0?0:1<<(log 2_matrix_denom-1)

matrixOutput[*c*]=Clip3(0,(1<<color_remap_output_bit_depth)-1,(color_remap_coeffs[*c*][0]*matrixInput[0]+color_remap_coeffs[*c*][1]*matrixInput[1]+color_remap_coeffs[*c*][2]*matrixInput[2]+roundingOffset)>>log 2_matrix_denom)  (D-1)

where matrixInput[c] is the input sample value of the c-th color component, and matrixOutput[c] is the output sample value of the c-th color component.

post_lut_num_val_minus1[c] has the same semantics as pre_lut_num_val_minus1[c], with "pre" replaced by "post", except that the default end points of the input values are 0 and $2^{color\_remap\_output\_bit\_depth}-1$ for the c-th color component. The value of post_lut_num_val_minus1[c] shall be in the range of 0 to 32, inclusive.

post_lut_coded_value[c][i] has the same semantics as pre_lut_coded_value[c][i], with "pre" replaced by "post", except that the number of bits used to represent post_lut_coded_value[c][i] is ((color_remap_output_bit_depth+7)>>3)<<3.

post_lut_target_value[c][i] has the same semantics as pre_lut_target_value[c][i], with "pre" replaced by "post".

FIG. 5 is a flowchart illustrating an example of a process 500 of processing video data using one or more of the techniques described herein. At block 502, the process 500 includes obtaining a video bitstream. The video bitstream includes a plurality of pictures having a first color characteristic. The first color characteristics can include any color characteristic, such as a color space (e.g., YCbCr, RGB, YUV, or other suitable color space), a dynamic range (e.g., HDR, SDR, or other color range), a transfer function (e.g., Gamma transfer function, PQ transfer function, or other suitable transfer function), any combination thereof, or any other color characteristic that can vary across different video content.

At block 504, the process 500 includes identifying, from the video bitstream, a color remapping information (CRI) supplemental enhancement information (SEI) message. One or more values of at least one syntax element of the CRI SEI message are restricted based on a condition. For example, the CRI SEI message can include a restriction such that a value of a syntax element of the CRI SEI message is restricted based on the condition. The condition can include any suitable condition for restricting certain syntax elements. For example, the condition can include a chroma format of the plurality of pictures, a color remap value (e.g., a color_remap_id value) identifying a purpose of the color remapping model of the CRI SEI message, or any other suitable condition.

At block 506, the process 500 includes remapping one or more samples of the plurality of pictures from the first color characteristic to a second color characteristic using a color remapping model of the CRI SEI message. The second color characteristics can include any color characteristic defined by the color remapping model. For example, the second color characteristic can be a color space (e.g., YCbCr, RGB, YUV, or other suitable color space), a dynamic range (e.g., HDR, SDR, or other color range), a transfer function (e.g., Gamma transfer function, PQ transfer function, or other suitable transfer function), any combination thereof, or any other color characteristic that can vary across different video content.

In some examples, the process 500 further includes determining a chroma format of the plurality of pictures, in which case the condition is the chroma format of the plurality of pictures. In such examples, the one or more values of the at least one syntax element of the CRI SEI message are restricted based on the chroma format of the plurality of pictures.

In some examples, the process 500 further includes determining a color remap value identifying a purpose of the color remapping model of the CRI SEI message. The condition is the color remap value in such examples, and the one or more values of the at least one syntax element of the CRI SEI message are restricted based on the color remap value.

In some examples, the condition can include both the chroma format and the color remap value. For instance, the process 500 can further include determining a chroma format of the plurality of pictures and determining a color remap value identifying a purpose of the color remapping model of the CRI SEI message. In such examples, the condition is the chroma format of the plurality of pictures and the color remap value, and the one or more values of the at least one syntax element of the CRI SEI message are restricted based on the chroma format of the plurality of pictures and based on the color remap value.

In some implementations, the color remapping model of the CRI SEI message includes a pre-lookup table, a color remap matrix, and a post-lookup table. In some examples, the at least one syntax element for which the one or more values are restricted can include a syntax element for the pre-lookup table, a syntax element for the color remap matrix, a syntax element for the post-lookup table, or two or all of these syntax elements.

For example, in some cases, the at least one syntax element of the CRI SEI message includes a color remap matrix present flag indicating whether the color remap matrix is present. In such an example, the process 500 includes determining, based on the condition, the color remap matrix present flag is restricted to be equal to a value indicating the color remap matrix is not present. In examples in which the condition is a chroma format, if the chroma format of the plurality of pictures includes a format indicating that the color remap matrix should not be applied, it can be determined that the color remap matrix present flag is restricted to be equal to the value. In one illustrative example, the condition is a chroma format of the plurality of pictures, and the color remap matrix present flag is determined to be restricted to be equal to the value when the chroma format is determined to be a 4:2:2 chroma format, a 4:2:0 chroma format, or a 4:0:0 chroma format. In examples in which the condition is the color remap value, it can be determined that the color remap matrix present flag is restricted to be equal to the value when the color remap value indicates that the color remapping model is to be used for a purpose for which the color remap matrix should not be applied (e.g., the color_remap_ID can indicate that the pre-LUT mapping is to be applied directly on the 4:2:0 domain, for instance, rather than 4:4:4 domain as it would require fewer mapping operations).

The process 500 can further include applying the color remapping model to the one or more samples without applying the color remap matrix when the color remap matrix present flag is restricted to be equal to the value. In some examples, the process 500 further includes inferring the color remap matrix as being equal to an identity matrix when the color remap matrix present flag is restricted to be equal to the value. In some cases, applying the color remapping model to the one or more samples includes applying the identity matrix.

In another example, the at least one syntax element of the CRI SEI message includes a post-lookup table number syntax element indicating input and output values of the post-lookup table. In such an example, the process 500 includes determining, based on the condition, the post-lookup table number syntax element is restricted to be equal to a value indicating the input and output values are equal to 0. For example, the chroma format of the pictures can indicate that the post-lookup table is not needed to remap the one or more samples. In another example, the purpose of the color remapping model (as indicated by the color remap value) may be one that does not require the post-lookup table.

The process 500 can further include applying the color remapping model to the one or more samples without applying the post-lookup table when the post-lookup table number syntax element is restricted to be equal to the value. In some examples, the process 500 further includes inferring the post-lookup table as being an identity mapping when the post-lookup table number syntax element is restricted to be equal to the value. In some cases, applying the color remapping model to the one or more samples includes performing the identity mapping.

In another example, the at least one syntax element of the CRI SEI message includes a pre-lookup table number syntax element indicating input and output values of the pre-lookup table. In such an example, the process 500 includes determining, based on the condition, the pre-lookup table number syntax element is restricted to be equal to a value indicating the input and output values are equal to 0. For example, the chroma format of the pictures can indicate that the pre-lookup table is not needed to remap the one or more samples. In another example, the purpose of the color remapping model (as indicated by the color remap value) may be one that does not require the pre-lookup table.

The process 500 can further include applying the color remapping model to the one or more samples without applying the pre-lookup table when the pre-lookup table number syntax element is restricted to be equal to the value. In some examples, the process 500 further includes inferring the pre-lookup table as being an identity mapping when the pre-lookup table number syntax element is restricted to be equal to the value. In some cases, applying the color remapping model to the one or more samples includes performing the identity mapping.

Figure 6:
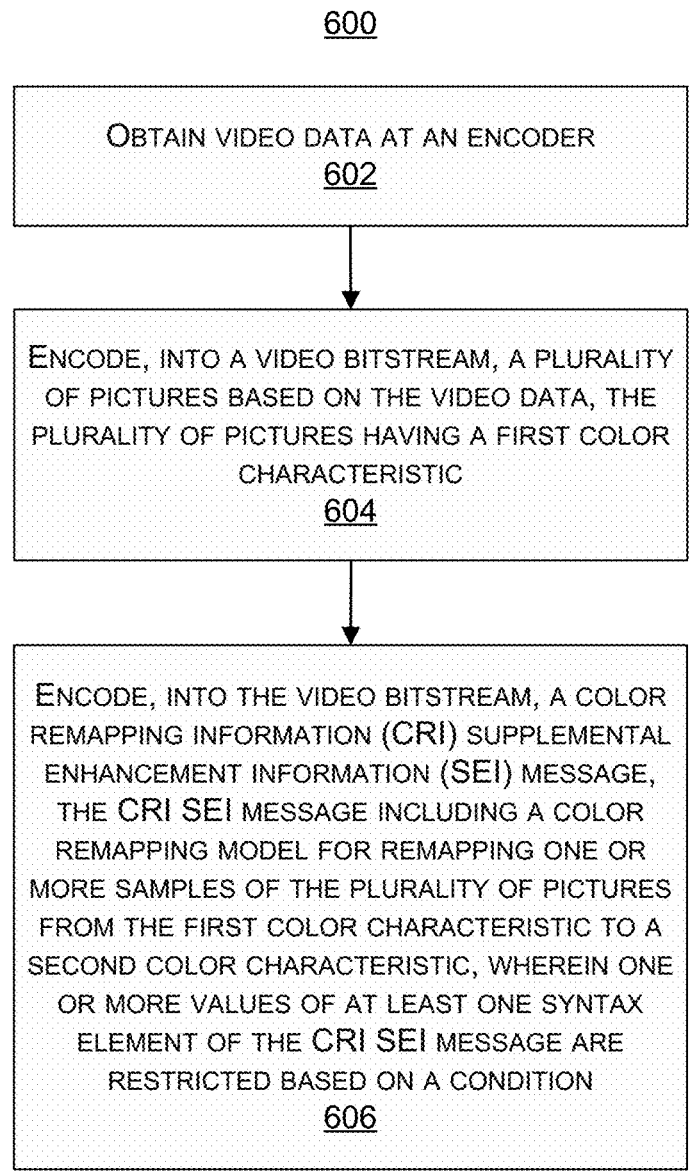
FIG. 6 illustrates a flowchart illustrating an example of a process of encoding video data, in accordance with some examples.

FIG. 6 is a flowchart illustrating an example of a process 600 of encoding video data using one or more of the techniques described herein. At 602, the process 600 includes obtaining video data at an encoder.

At 604, the process 600 includes encoding, into a video bitstream, a plurality of pictures based on the video data. The plurality of pictures have a first color characteristic. The first color characteristics can include any color characteristic, such as a color space (e.g., YCbCr, RGB, YUV, or other suitable color space), a dynamic range (e.g., HDR, SDR, or other color range), a transfer function (e.g., Gamma transfer function, PQ transfer function, or other suitable transfer function), any combination thereof, or any other color characteristic that can vary across different video content.

At 606, the process 600 includes encoding, into the video bitstream, a color remapping information (CRI) supplemental enhancement information (SEI) message. The CRI SEI message includes a color remapping model for remapping one or more samples of the plurality of pictures from the first color characteristic to a second color characteristic. The second color characteristics can include any color characteristic defined by the color remapping model. For example, the second color characteristic can be a color space (e.g., YCbCr, RGB, YUV, or other suitable color space), a dynamic range (e.g., HDR, SDR, or other color range), a transfer function (e.g., Gamma transfer function, PQ transfer function, or other suitable transfer function), any combination thereof, or any other color characteristic that can vary across different video content.

The one or more values of at least one syntax element of the CRI SEI message are restricted based on a condition. For example, the CRI SEI message can include a restriction such that a value of a syntax element of the CRI SEI message is restricted based on the condition. The condition can be added by the encoder, and in some cases can be encoded into the video bitstream. The condition can include any suitable condition for restricting certain syntax elements. For example, the condition can include a chroma format of the plurality of pictures, a color remap value (e.g., a color_remap_id value) identifying a purpose of the color remapping model of the CRI SEI message, or any other suitable condition.

In some examples, the condition is a chroma format of the plurality of pictures. In such examples, the one or more values of the at least one syntax element of the CRI SEI message are restricted based on the chroma format of the plurality of pictures.

In some examples, the condition is a color remap value identifying a purpose of the color remapping model of the CRI SEI message, in which case the one or more values of the at least one syntax element of the CRI SEI message are restricted based on the color remap value.

In some examples, the condition can include a chroma format of the plurality of pictures and a color remap value identifying a purpose of the color remapping model of the CRI SEI message. In such examples, the one or more values of the at least one syntax element of the CRI SEI message are restricted based on the chroma format of the plurality of pictures and based on the color remap value.

In some implementations, the color remapping model of the CRI SEI message includes a pre-lookup table, a color remap matrix, and a post-lookup table. In some examples, the at least one syntax element for which the one or more values are restricted can include a syntax element for the pre-lookup table, a syntax element for the color remap matrix, a syntax element for the post-lookup table, or two or all of these syntax elements.

For example, in some cases, the at least one syntax element of the CRI SEI message includes a color remap matrix present flag indicating whether the color remap matrix is present. In such an example, the color remap matrix present flag is restricted to be equal to a value based on the condition, the value of the color remap matrix present flag indicating the color remap matrix is not present. In examples in which the condition is a chroma format, the color remap matrix present flag can be restricted to be equal to the value for chroma formats for which the color remap matrix should not be applied. In one illustrative example, the condition is a chroma format of the plurality of pictures, and the color remap matrix present flag is restricted to be equal to the value when the chroma format is determined to be a 4:2:2 chroma format, a 4:2:0 chroma format, or a 4:0:0 chroma format. In examples in which the condition is the color remap value, the color remap matrix present flag can be restricted to be equal to the value for color remap values applying to purposes that do not or cannot apply the color remap matrix (e.g., the color_remap_ID can indicate that the pre-LUT mapping is to be applied directly on the 4:2:0 domain, for instance, rather than 4:4:4 domain as it would require fewer mapping operations).

In some examples, the color remap matrix is inferred as being equal to an identity matrix when the color remap matrix present flag is restricted to be equal to the value. In such an example, a client-side device can apply the color remapping model to the one or more samples by applying the identity matrix.

In another example, the at least one syntax element of the CRI SEI message includes a post-lookup table number syntax element indicating input and output values of the post-lookup table. In such an example, the post-lookup table number syntax element is restricted to be equal to a value based on the condition, the value of the post-lookup table number syntax element indicating the input and output values are equal to 0. For example, the restriction to the post-lookup table number syntax element can be applied for chroma formats for which the post-lookup table is not needed or cannot be used for remapping the one or more samples. In another example, the restriction to the post-lookup table number syntax element can be applied for certain purposes of the color remapping model (as indicated by the color remap value) that do not require or that cannot use the post-lookup table.

In some examples, the post-lookup table is inferred as being an identity mapping when the post-lookup table number syntax element is restricted to be equal to the value. In such an example, a client-side device can apply the color remapping model to the one or more samples by applying the identity mapping.

In another example, the at least one syntax element of the CRI SEI message includes a pre-lookup table number syntax element indicating input and output values of the pre-lookup table. In such an example, the pre-lookup table number syntax element is restricted to be equal to a value based on the condition, the value of the pre-lookup table number syntax element indicating the input and output values are equal to 0. For example, the restriction to the pre-lookup table number syntax element can be applied for chroma formats for which the pre-lookup table is not needed or cannot be used for remapping the one or more samples. In another example, the restriction to the pre-lookup table number syntax element can be applied for certain purposes of the color remapping model (as indicated by the color remap value) that do not require or that cannot use the pre-lookup table.

In some examples, the pre-lookup table is inferred as being an identity mapping when the pre-lookup table number syntax element is restricted to be equal to the value. In such an example, a client-side device can apply the color remapping model to the one or more samples by applying the identity mapping.

In some examples, the processes 500 and 600 may be performed by a computing device or an apparatus, such as the system 100 shown in FIG. 1. For example, the process 500 can be performed by the decoding device 112 shown in FIG. 1 and FIG. 8 or by another client-side device, such as a player device, a display, or any other client-side device. The process 600 can be performed by the encoding device 104 shown in FIG. 1 and FIG. 7. In some cases, the computing device or apparatus may include a processor, microprocessor, microcomputer, or other component of a device that is configured to carry out the steps of processes 500 and 600. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

Processes 500 and 600 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 500 and 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The color remapping techniques discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 7:
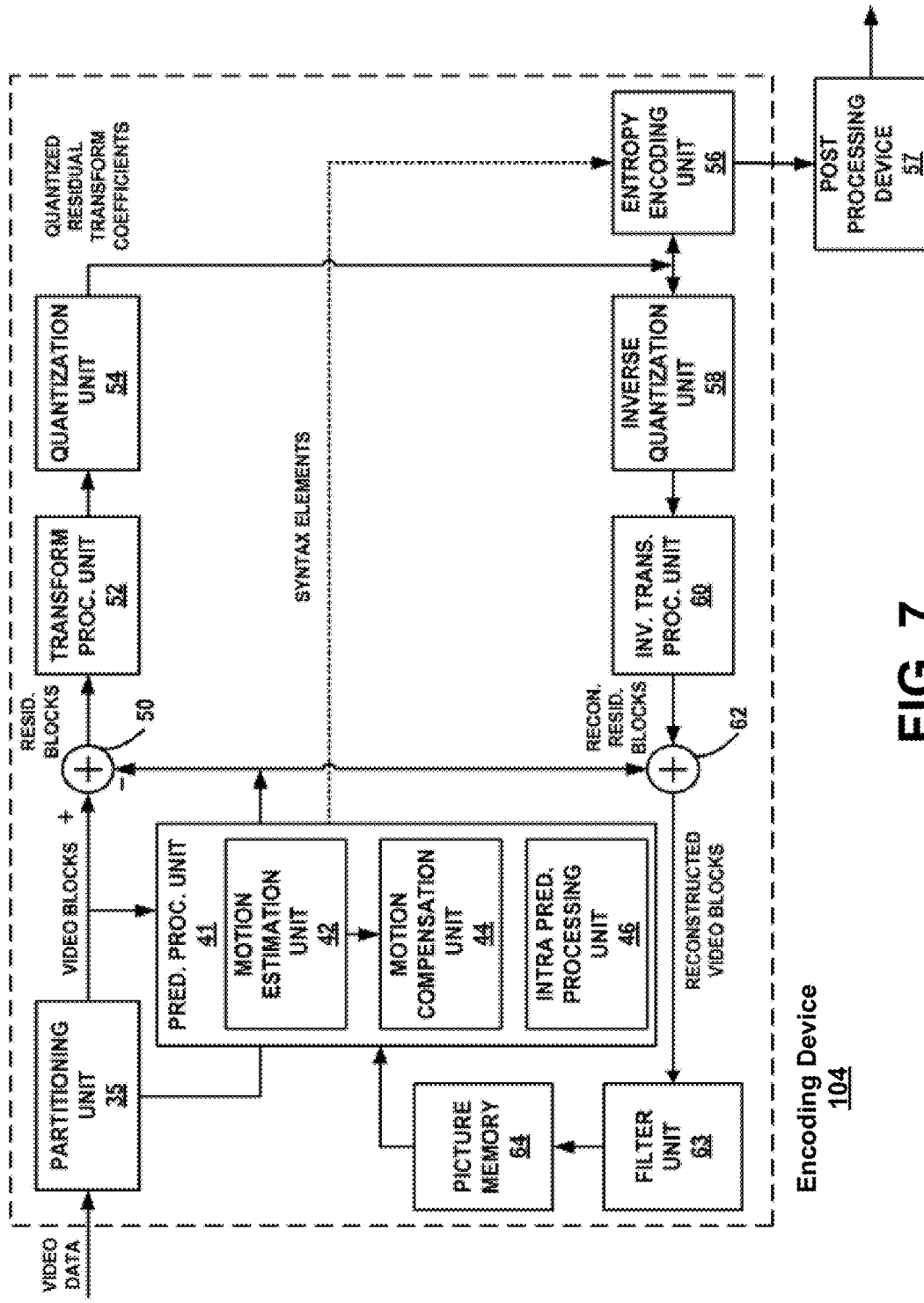
FIG. 7 is a block diagram illustrating an example video encoding device, in accordance with some examples.
Figure 8:
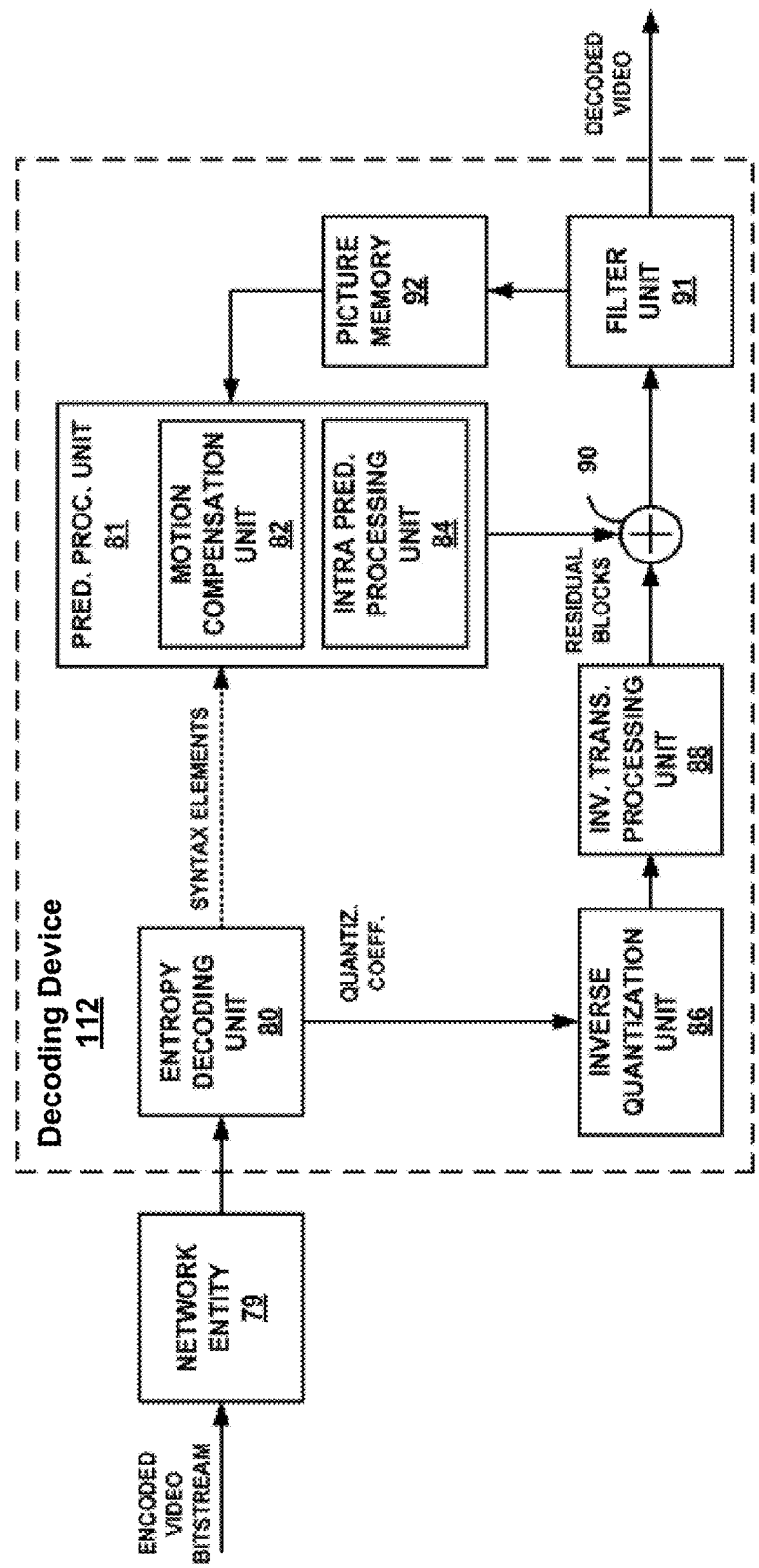
FIG. 8 is a block diagram illustrating an example video decoding device, in accordance with some examples.

Specific details of the encoding device 104 and the decoding device 112 are shown in FIG. 7 and FIG. 8, respectively. FIG. 7 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 7 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 7, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 7 represents an example of a video encoder configured to generate syntax for a encoded video bitstream. The encoding device 104 may, for example, generate syntax for a CRI SEI message, as described above. The encoding device 104 may perform any of the techniques described herein, including the process described above with respect to FIG. 6. The techniques of this disclosure have generally been described with respect to the encoding device 104, but as mentioned above, some of the techniques of this disclosure may also be implemented by post processing device 57.

FIG. 8 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 7. The decoding device 112 may perform any of the techniques described herein, including the process described above with respect to FIG. 5.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 8 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing video data, the method comprising:
    obtaining a video bitstream, the video bitstream including a plurality of pictures having a first color characteristic, wherein a chroma format of the plurality of pictures comprises a sub sampling format;
    identifying, from the video bitstream, a color remapping information (CRI) supplemental enhancement information (SEI) message, wherein one or more values of at least one syntax element of the CRI SEI message are restricted based on a condition; and
    remapping one or more samples of the plurality of pictures from the first color characteristic to a second color characteristic using a color remapping model of the CRI SEI message without upsampling the one or more samples.

2. The method of claim 1, further comprising:
    determining the chroma format of the plurality of pictures, wherein the condition is the chroma format of the plurality of pictures, and wherein the one or more values of the at least one syntax element of the CRI SEI message are restricted based on the chroma format of the plurality of pictures.

3. The method of claim 1, further comprising:
    determining a color remap value identifying a purpose of the color remapping model of the CRI SEI message, wherein the condition is the color remap value, and wherein the one or more values of the at least one syntax element of the CRI SEI message are restricted based on the color remap value.

4. The method of claim 1, further comprising:
    determining the chroma format of the plurality of pictures; and
    determining a color remap value identifying a purpose of the color remapping model of the CRI SEI message;
    wherein the condition is the chroma format of the plurality of pictures and the color remap value, and wherein the one or more values of the at least one syntax element of the CRI SEI message are restricted based on the chroma format of the plurality of pictures and based on the color remap value.

5. The method of claim 1, wherein the color remapping model of the CRI SEI message includes a pre-lookup table, a color remap matrix, and a post-lookup table.

6. The method of claim 5, wherein the at least one syntax element of the CRI SEI message includes a color remap matrix present flag indicating whether the color remap matrix is present, and further comprising:
determining, based on the condition, the color remap matrix present flag is restricted to be equal to a value indicating the color remap matrix is not present; and
applying the color remapping model to the one or more samples without applying the color remap matrix when the color remap matrix present flag is restricted to be equal to the value.

7. The method of claim 6, wherein the condition is the chroma format of the plurality of pictures, and wherein the color remap matrix present flag is determined to be restricted to be equal to the value when the chroma format is determined to be a 4:2:2 chroma format, a 4:2:0 chroma format, or a 4:0:0 chroma format.

8. The method of claim 6, further comprising:
inferring the color remap matrix as being equal to an identity matrix when the color remap matrix present flag is restricted to be equal to the value; and
wherein applying the color remapping model to the one or more samples includes applying the identity matrix.

9. The method of claim 5, wherein the at least one syntax element of the CRI SEI message includes a post-lookup table number syntax element indicating input and output values of the post-lookup table, and further comprising:
determining, based on the condition, the post-lookup table number syntax element is restricted to be equal to a value indicating the input and output values are equal to 0; and
applying the color remapping model to the one or more samples without applying the post-lookup table when the post-lookup table number syntax element is restricted to be equal to the value.

10. The method of claim 9, further comprising:
inferring the post-lookup table as being an identity mapping when the post-lookup table number syntax element is restricted to be equal to the value; and
wherein applying the color remapping model to the one or more samples includes performing the identity mapping.

11. The method of claim 5, wherein the at least one syntax element of the CRI SEI message includes a pre-lookup table number syntax element indicating input and output values of the pre-lookup table, and further comprising:
determining, based on the condition, the pre-lookup table number syntax element is restricted to be equal to a value indicating the input and output values are equal to 0; and
applying the color remapping model to the one or more samples without applying the pre-lookup table when the pre-lookup table number syntax element is restricted to be equal to the value.

12. The method of claim 11, further comprising:
inferring the pre-lookup table as being an identity mapping when the pre-lookup table number syntax element is restricted to be equal to the value; and
wherein applying the color remapping model to the one or more samples includes performing the identity mapping.

13. An apparatus comprising:
a memory configured to store video data; and
a processor configured to:
obtain a video bitstream, the video bitstream including a plurality of pictures having a first color characteristic, wherein a chroma format of the plurality of pictures comprises a sub sampling format;
identify, from the video bitstream, a color remapping information (CRI) supplemental enhancement information (SEI) message, wherein one or more values of at least one syntax element of the CRI SEI message are restricted based on a condition; and
remap one or more samples of the plurality of pictures from the first color characteristic to a second color characteristic using a color remapping model of the CRI SEI message without upsampling the one or more samples.

14. The apparatus of claim 13, wherein the processor is configured to:
determine the chroma format of the plurality of pictures, wherein the condition is the chroma format of the plurality of pictures, and wherein the one or more values of the at least one syntax element of the CRI SEI message are restricted based on the chroma format of the plurality of pictures.

15. The apparatus of claim 13, wherein the processor is configured to:
determine a color remap value identifying a purpose of the color remapping model of the CRI SEI message, wherein the condition is the color remap value, and wherein the one or more values of the at least one syntax element of the CRI SEI message are restricted based on the color remap value.

16. The apparatus of claim 13, wherein the processor is configured to:
determine the chroma format of the plurality of pictures; and
determine a color remap value identifying a purpose of the color remapping model of the CRI SEI message;
wherein the condition is the chroma format of the plurality of pictures and the color remap value, and wherein the one or more values of the at least one syntax element of the CRI SEI message are restricted based on the chroma format of the plurality of pictures and based on the color remap value.

17. The apparatus of claim 13, wherein the color remapping model of the CRI SEI message includes a pre-lookup table, a color remap matrix, and a post-lookup table.

18. The apparatus of claim 17, wherein the at least one syntax element of the CRI SEI message includes a color remap matrix present flag indicating whether the color remap matrix is present, and wherein the processor is configured to:
determine, based on the condition, the color remap matrix present flag is restricted to be equal to a value indicating the color remap matrix is not present; and
apply the color remapping model to the one or more samples without applying the color remap matrix when the color remap matrix present flag is restricted to be equal to the value.

19. The apparatus of claim 18, wherein the condition is the chroma format of the plurality of pictures, and wherein the color remap matrix present flag is determined to be restricted to be equal to the value when the chroma format is determined to be a 4:2:2 chroma format, a 4:2:0 chroma format, or a 4:0:0 chroma format.

20. The apparatus of claim 18, wherein the processor is configured to:
    infer the color remap matrix as being equal to an identity matrix when the color remap matrix present flag is restricted to be equal to the value; and
    wherein applying the color remapping model to the one or more samples includes applying the identity matrix.

21. The apparatus of claim 17, wherein the at least one syntax element of the CRI SEI message includes a post-lookup table number syntax element indicating input and output values of the post-lookup table, and wherein the processor is configured to:
    determine, based on the condition, the post-lookup table number syntax element is restricted to be equal to a value indicating the input and output values are equal to 0; and
    apply the color remapping model to the one or more samples without applying the post-lookup table when the post-lookup table number syntax element is restricted to be equal to the value.

22. The apparatus of claim 21, wherein the processor is configured to:
    infer the post-lookup table as being an identity mapping when the post-lookup table number syntax element is restricted to be equal to the value; and
    wherein applying the color remapping model to the one or more samples includes performing the identity mapping.

23. The apparatus of claim 17, wherein the at least one syntax element of the CRI SEI message includes a pre-lookup table number syntax element indicating input and output values of the pre-lookup table, and wherein the processor is configured to:
    determine, based on the condition, the pre-lookup table number syntax element is restricted to be equal to a value indicating the input and output values are equal to 0; and
    apply the color remapping model to the one or more samples without applying the pre-lookup table when the pre-lookup table number syntax element is restricted to be equal to the value.

24. The apparatus of claim 23, wherein the processor is configured to:
    infer the pre-lookup table as being an identity mapping when the pre-lookup table number syntax element is restricted to be equal to the value; and
    wherein applying the color remapping model to the one or more samples includes performing the identity mapping.

25. The apparatus of claim 13, further comprising:
    a display for displaying the remapped one or more samples.

26. The apparatus of claim 13, wherein the apparatus comprises a mobile device with a camera.

27. A computer readable medium having stored thereon instructions that when executed by a processor perform a method, including:
    obtaining a video bitstream, the video bitstream including a plurality of pictures having a first color characteristic, wherein a chroma format of the plurality of pictures comprises a subsampling format;
    identifying, from the video bitstream, a color remapping information (CRI) supplemental enhancement information (SEI) message, wherein one or more values of at least one syntax element of the CRI SEI message are restricted based on a condition; and
    remapping one or more samples of the plurality of pictures from the first color characteristic to a second color characteristic using a color remapping model of the CRI SEI message without upsampling the one or more samples.

28. An apparatus comprising:
    means for obtaining a video bitstream, the video bitstream including a plurality of pictures having a first color characteristic, wherein a chroma format of the plurality of pictures comprises a subsampling format;
    means for identifying, from the video bitstream, a color remapping information (CRI) supplemental enhancement information (SEI) message, wherein one or more values of at least one syntax element of the CRI SEI message are restricted based on a condition; and
    means for remapping one or more samples of the plurality of pictures from the first color characteristic to a second color characteristic using a color remapping model of the CRI SEI message without upsampling the one or more samples.

* * * * *